(12) United States Patent
Coates et al.

(10) Patent No.: US 9,784,867 B2
(45) Date of Patent: Oct. 10, 2017

(54) SEISMIC DATA PROCESSING

(71) Applicant: Schlumberger Technology Corporation, Sugar Land, TX (US)

(72) Inventors: Richard Coates, Katy, TX (US); Kun Jiao, Katy, TX (US); Zhen Xu, Sugar Land, TX (US); Alan Schiemenz, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 259 days.

(21) Appl. No.: 14/676,389

(22) Filed: Apr. 1, 2015

(65) Prior Publication Data
US 2016/0291184 A1    Oct. 6, 2016

(51) Int. Cl.
*G01V 1/28* (2006.01)
*G01V 1/34* (2006.01)

(52) U.S. Cl.
CPC ............ *G01V 1/345* (2013.01); *G01V 1/282* (2013.01); *G01V 2210/51* (2013.01); *G01V 2210/614* (2013.01); *G01V 2210/679* (2013.01); *G01V 2210/74* (2013.01)

(58) Field of Classification Search
CPC ............ G01V 1/345; G01V 2210/51; G01V 2210/67; G01V 2210/679; G01V 2210/74
USPC ......................................................... 367/73
See application file for complete search history.

(56) References Cited

U.S. PATENT DOCUMENTS

| 5,555,218 | A | * | 9/1996 | Chambers | G01V 1/362 367/47 |
|---|---|---|---|---|---|
| 2010/0302906 | A1 | | 12/2010 | Liu | |
| 2011/0000678 | A1 | | 1/2011 | Krebs et al. | |
| 2011/0317519 | A1 | * | 12/2011 | Liu | G01V 1/28 367/50 |
| 2012/0072117 | A1 | * | 3/2012 | Loddoch | G01V 1/301 702/16 |
| 2012/0236685 | A1 | * | 9/2012 | Shan | G01V 1/28 367/50 |
| 2012/0316850 | A1 | | 12/2012 | Liu et al. | |
| 2013/0107665 | A1 | | 5/2013 | Fletcher et al. | |
| 2015/0057938 | A1 | | 2/2015 | Krohn et al. | |

OTHER PUBLICATIONS

Blanch, J. O., Robertsson, J. and Symes, W., Viscoelastic finite difference modeling, Geophysics, 59(9), 1994 (140 pages).

(Continued)

*Primary Examiner* — Ian J Lobo (57) ABSTRACT

A method includes the steps of receiving a wavefield generated by reflections in a subsurface region and recorded by a plurality of seismic receivers and compensating the recorded wavefield for amplitude attenuation. The method further includes modelling a propagation of a source wavefield forward in time, from an initial time-state to a final time-state through an earth model that is representative of the subsurface region, wherein the modelling includes phase and amplitude effects of attenuation and modelling a propagation of the compensated recorded wavefield backward in time from a final time-state to an earlier time-state through the earth model, wherein the subsurface region has an absorption characteristic that dampens the recorded wavefield wherein the modelling includes phase and amplitude effects of attenuation.

20 Claims, 8 Drawing Sheets

(56) References Cited

OTHER PUBLICATIONS

Blanch, J. O., Robertsson, J. and Symes, W., Modeling of a constant Q: Methodology and algorithm for an efficient and optimally inexpensive viscoelastic technique, Geophysics, 60(1), 1995 (38 pages).
Bai, J., Yingst, D., Bloor, R. and Leveille, J., Waveform inversion with attenuation, SEG expanded abstract, 2012 (5 pages).
Dutta, G., Lu, K., Wang, X. and Schuster, G., Attenuation compensation in least-squares reverse time migration using the visco-acoustic wave equation, SEG expanded abstract, 2013 (5 pages).
Casula, G. and Carcione, J. M., Generalized mechanical model analogies of linear viscoelastic behavior, BGTA vol. XXXIV, 1992 (22 pages).
Carcione, J. M., Kosloff, D. and Kosloff, R., Wave propagation simulation in a linear viscoelastic medium, Geophys. J., 95, 1988. pp. 597-611.
International Search Report and Written opinion issued in the related PCT application PCT/US2016/025238, Jul. 11, 2016 (14 pages).

* cited by examiner

SEISMIC DATA PROCESSING

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and applicant neither concedes nor acquiesces to the position that any given reference is prior art or analogous prior art.

Seismic exploration may utilize a seismic energy source to generate acoustic signals that propagate into the earth along curved paths and refract and partially reflect off subsurface seismic reflectors (e.g., interfaces between subsurface layers). These propagating signals are recorded by sensors (e.g., receivers or geophones located in seismic units) laid out in a seismic spread covering a region of the earth's surface. The recorded signals may then be processed to yield a seismic survey.

Attenuation effects of the Earth are known to alter the phase and amplitude properties of the seismic wavefield, leading to poor resolution in depth-migrated images in and below highly attenuating regions.

Accordingly, there is a need for methods and computing systems that can employ more effective and accurate methods for properly compensating for the seismic attenuation parameter Q, thereby improving depth-migrated images by correcting phase dispersion. Uncorrected phase dispersion often leads to mis-positioned and unfocused reflectors, and amplitude loss, which diminishes the signal to noise ratio of the image of a subsurface region or other multi-dimensional space.

The above referenced summary section is provided to introduce a selection of concepts that are further described below in the detailed description section. The summary is not intended to identify features of the claimed subject matter, nor is it intended to be used to limit the scope of the claimed subject matter. Furthermore, the claimed subject matter is not limited to implementations that solve any or most disadvantages noted in any part of this disclosure. Indeed, the systems, methods, processing procedures, techniques, and workflows disclosed herein may complement or replace conventional methods for identifying, isolating, and/or processing various aspects of seismic signals or other data that is collected from a subsurface region or other multi-dimensional space, including time-lapse seismic data collected in a plurality of surveys.

One embodiment of a method for processing seismic data includes the steps of receiving a wavefield generated by reflections in a subsurface region and recorded by a plurality of seismic receivers and compensating the recorded wavefield for amplitude attenuation. The method further includes modelling a propagation of a source wavefield forward in time, from an initial time-state to a final time-state through an earth model that is representative of the subsurface region, wherein the modelling includes phase and amplitude effects of attenuation and modelling a propagation of the compensated recorded wavefield backward in time from a final time-state to an earlier time-state through the earth model, wherein the subsurface region has an absorption characteristic that dampens the recorded wavefield wherein the modelling includes phase and amplitude effects of attenuation. Furthermore, the method includes a step of rendering an image of the subsurface region based at least in part on the modelled source and the modelled compensated recorded wavefield.

Another embodiment of the presend disclosure includes a non-transitory computer-readable medium storing instructions that, when executed by one or more processors of a computing system, cause the computing system to perform operations, the operations including the steps of compensating the recorded wavefield for amplitude attenuation and modelling a propagation of a source wavefield forward in time, from an initial time-state to a final time-state through an earth model that is representative of the subsurface region, wherein the modelling includes phase and amplitude effects of attenuation. Further included are the steps of modelling a propagation of the compensated recorded wavefield backward in time from a final time-state to an earlier time-state through the earth model, wherein the subsurface region has an absorption characteristic that dampens the recorded wavefield wherein the modelling includes phase and amplitude effects of attenuation and rendering an image of the subsurface region based at least in part on the modelled source and the modelled compensated recorded wavefield.

Yet another embodiment of the present disclosure includes a computing system including one or more processors and a memory system comprising one or more non-transitory computer-readable media storing instructions that, when executed by at least one of the one or more processors, cause the computing system to perform operations, the operations including the steps of compensating the recorded wavefield for amplitude attenuation and modelling a propagation of a source wavefield forward in time, from an initial time-state to a final time-state through an earth model that is representative of the subsurface region, wherein the modelling includes phase and amplitude effects of attenuation. The operations include the further steps of modelling a propagation of the compensated recorded wavefield backward in time from a final time-state to an earlier time-state through the earth model, wherein the subsurface region has an absorption characteristic that dampens the recorded wavefield wherein the modelling includes phase and amplitude effects of attenuation and rendering an image of the subsurface region based at least in part on the modelled source and the modelled compensated recorded wavefield.

Another embodiment of the present disclosure includes a method for processing seismic data having the steps of receiving a wavefield generated by reflections in a subsurface region and recorded by a plurality of seismic receivers, compensating the recorded wavefield for amplitude attenuation and modelling a propagation of a source wavefield forward in time, from an initial time-state to a final time-state through an earth model that is representative of the subsurface region, wherein the modelling includes phase and amplitude effects of attenuation. The method further includes the steps of modelling a propagation of the compensated recorded wavefield backward in time from a final time-state to an earlier time-state through the earth model, wherein the subsurface region has an absorption characteristic that dampens the recorded wavefield wherein the modelling includes phase and amplitude effects of attenuation, applying a post migration amplitude compensation to the recorded wavefield, and rendering an image of the subsurface region based at least in part on the modelled source and the modelled compensated recorded wavefields.

BRIEF DESCRIPTION OF THE DRAWINGS

Implementations of various technologies will hereafter be described with reference to the accompanying drawings. It should be understood, however, that the accompanying drawings illustrate various implementations described herein and are not meant to limit the scope of various technologies described herein.

DETAILED DESCRIPTION

The discussion below is directed to certain specific implementations. It is to be understood that the discussion below is for the purpose of enabling a person with ordinary skill in the art to make and use any subject matter defined now or later by the patent "claims" found in any issued patent herein.

Reference will now be made in detail to various implementations, examples of which are illustrated in the accompanying drawings and figures. In the following detailed description, numerous specific details are set forth in order to provide a thorough understanding of the claimed invention. However, it will be apparent to one of ordinary skill in the art that the claimed invention may be practiced without these specific details. In other instances, well known methods, procedures, components, circuits, and networks have not been described in detail so as not to unnecessarily obscure aspects of the claimed invention.

It will also be understood that, although the terms first, second, etc. may be used herein to describe various elements, these elements should not be limited by these terms. These terms are used to distinguish one element from another. For example, a first object or block could be termed a second object or block, and, similarly, a second object or block could be termed a first object or block, without departing from the scope of the invention. The first object or block, and the second object or block, are both objects or blocks, respectively, but they are not to be considered the same object or block.

The terminology used in the description herein is for the purpose of describing particular implementations and is not intended to limit the claimed invention. As used herein, the singular forms "a", "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises," and/or "comprising," when used in this specification, specify the presence of stated features, integers, blocks, operations, elements, and/or components, but do not preclude the presence or addition of one or more other features, integers, blocks, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Oil Operation

Figure 1A:
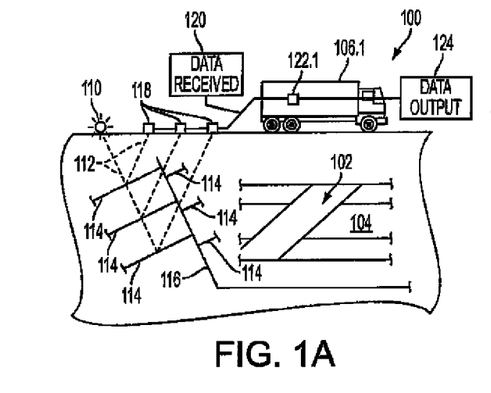
FIGS. 1A-1D illustrate schematic views of oilfields in accordance with various implementations described herein.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output/wavefield 124. This seismic data output may be stored, transmitted or further processed as desired, for example, by data reduction.

Figure 1B:
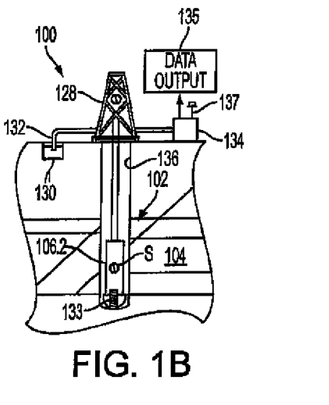

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

The wellbore may be drilled according to a drilling plan that is established prior to drilling. The drilling plan may set forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

Figures 1C, 1D:
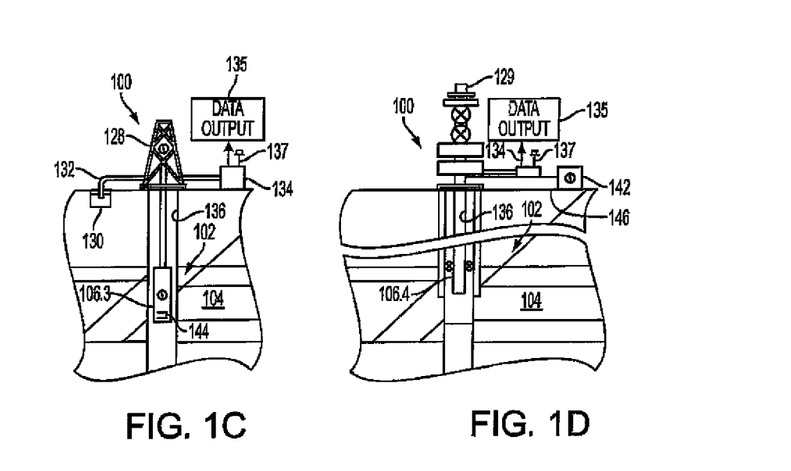

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the complete, oilfield 100 may be on land, water, and/or sea. Also, while a single field measured at a single location is depicted, oilfield applications may be utilized with any combination of one or more oilfields, one or more processing facilities and one or more wellsites.

Figure 2:
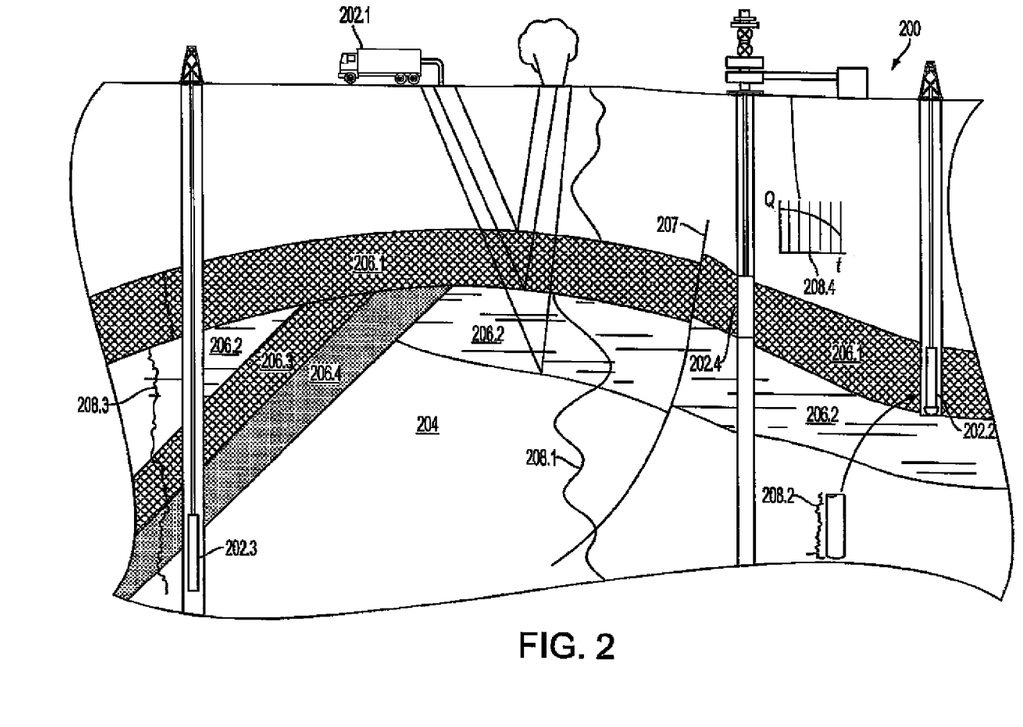
FIG. 2 illustrates a schematic view of an oilfield in accordance with various implementations described herein.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively.

These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that provides a resistivity or other measurement of the formation at various depths.

A production decline curve or graph 208.4 is a dynamic data plot of the fluid flow rate over time. The production decline curve provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3:
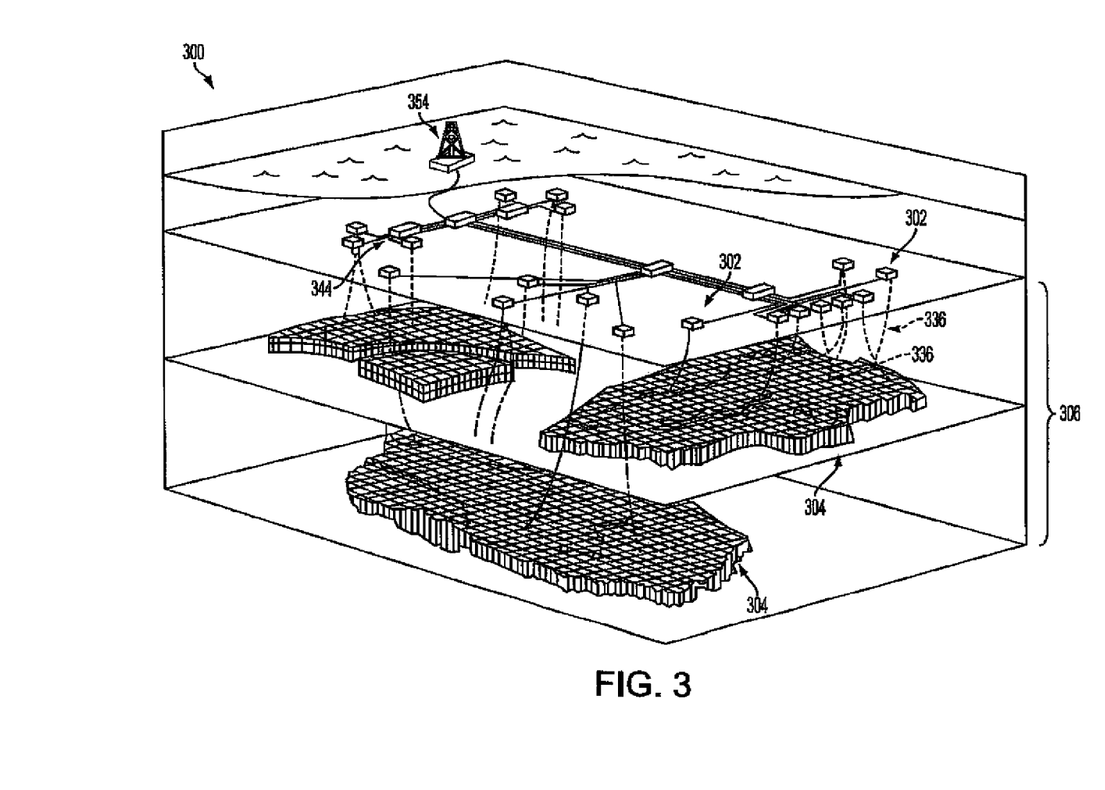
FIG. 3 illustrates an oilfield in accordance with various implementations described herein.

FIG. 3 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3 is not intended to limit the scope of the oilfield application system. Part, or the entirety, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 4:
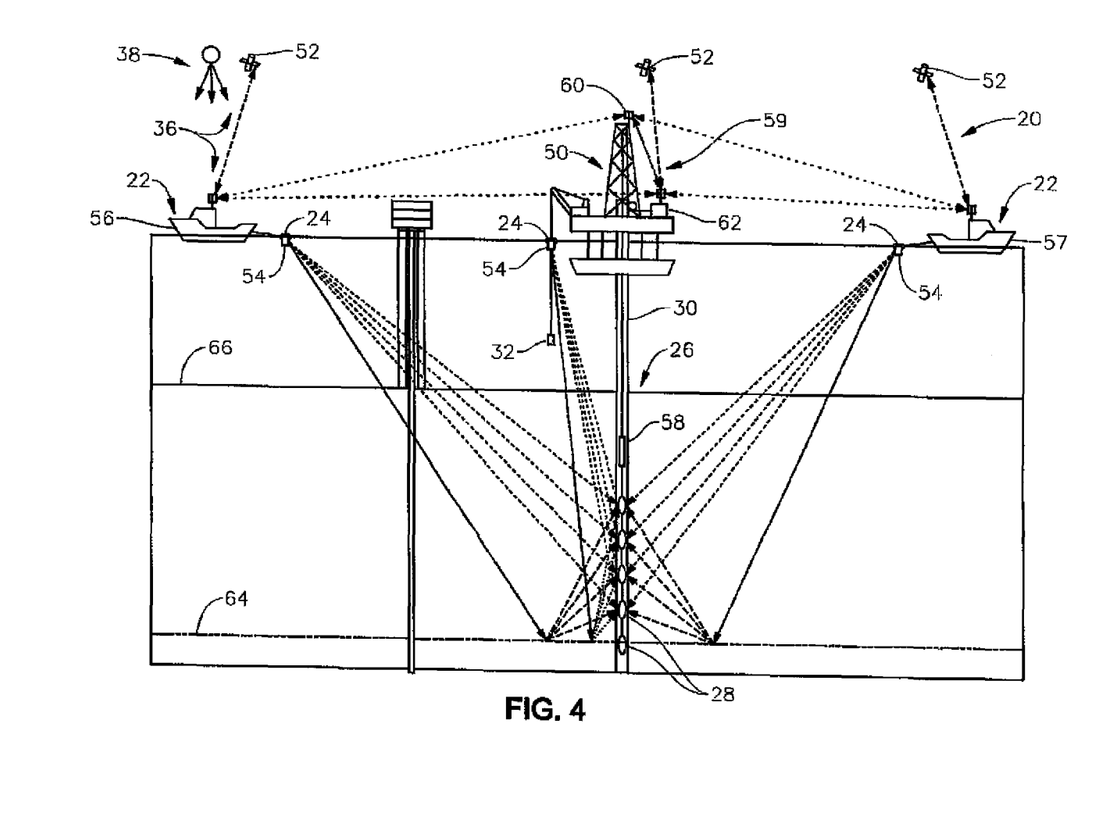
FIG. 4 illustrates a seismic system in accordance with various implementations described herein.

Attention is now directed to FIG. 4 that depicts an embodiment of seismic system 20 in which a plurality of tow vessels 22 is employed to enable seismic profiling, e.g. three-dimensional vertical seismic profiling or rig/offset vertical seismic profiling. In FIG. 4, a marine system is illustrated as including a rig 50, a plurality of vessels 22, and one or more acoustic receivers 28. Although a marine system is illustrated, other embodiments of the disclosure may not be limited to this example. A person of ordinary skill in the art will recognize that teachings of the disclosure may be used in land or offshore systems. However, offshore systems are described herein to simplify the disclosure and to facilitate explanation.

Although two vessels 22 are illustrated in FIG. 4, a single vessel 22 with multiple source arrays 24 or multiple vessels 22 each with single or multiple sources 24 may be used. In some applications, at least one source/source array 24 may be located on the rig 50 as represented by the rig source in FIG. 4. As the vessels 22 travel on predetermined or systematic paths, their locations may be recorded through the use of navigation system 36. In some cases, the navigation system 36 utilizes a global positioning system (GPS) 38 to record the position, speed, direction, and other parameters of the tow vessels 22.

As illustrated, the global positioning system 38 may utilize or work in cooperation with satellites 52 which operate on a suitable communication protocol, e.g. VSAT communications. The VSAT communications may be used, among other things, to supplement VHF and UHF communications. The GPS information can be independent of the VSAT communications and may be input to processing system or other suitable processors to predict the future movement and position of the vessels 22 based on real-time information. In addition to predicting future movements, the processing system also can be utilized to provide directions and coordinates as well as to determine initial shot times, as described above. Control system 34 effectively utilizes processing system in cooperation with source controller and synchronization unit to synchronize the sources 24 with the downhole data acquisition system 26.

As illustrated, the one or more vessels 22 each tow one or more acoustic sources/source arrays 24. The source arrays 24 include one or more seismic signal generators 54, e.g. air guns, configured to create a seismic/sonic disturbance. In the embodiment illustrated, the tow vessels 22 comprise a master source vessel 56 (Vessel A) and a slave source vessel 57 (Vessel B). However, other numbers and arrangements of tow vessels 22 may be employed to accommodate the parameters of a given seismic profiling application. For example, one source 24 may be mounted at rig 50 (see FIG. 4) or at another suitable location, and both vessels 22 may serve as slave vessels with respect to the rig source 24 or with respect to a source at another location.

Figure 5:
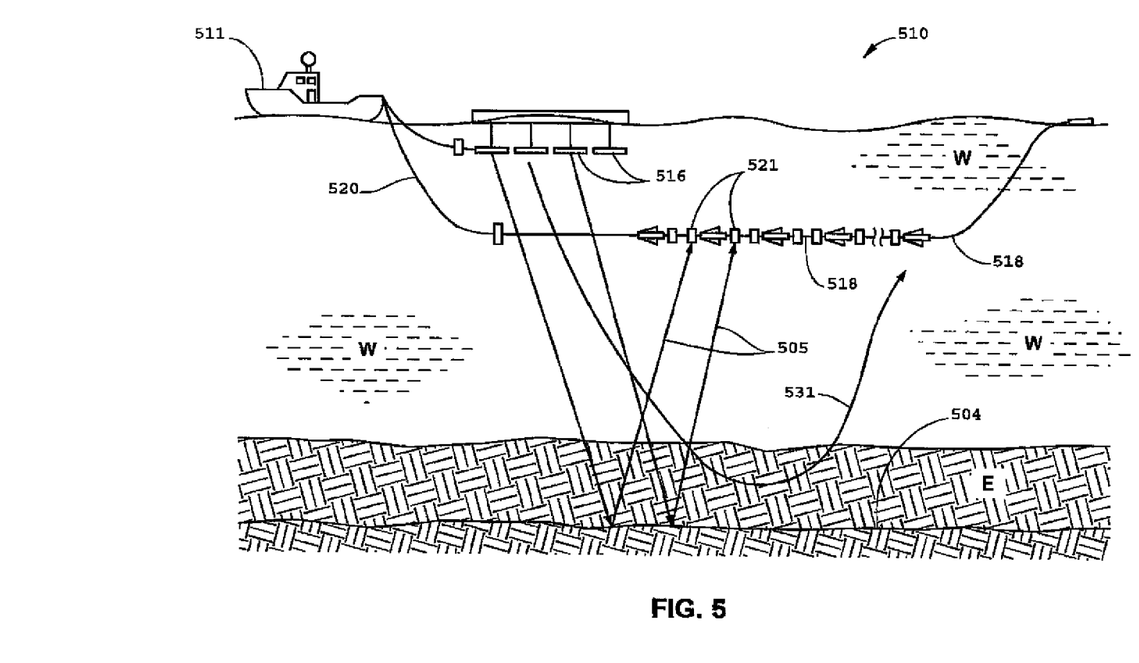
FIG. 5 illustrates a diagrammatic view of marine seismic surveying in accordance with various implementations described herein.

FIG. 5 illustrates a diagrammatic view of marine seismic surveying 510 in connection with implementations of various techniques described herein. A marine seismic acquisition system 510 may include a vessel 511 carrying control components and towing a plurality of seismic sources 516 and a plurality of streamers 518 equipped with seismic receivers 521. The seismic sources 516 may include a single type of source, or different types. The sources may use any type of seismic generator, such as air guns, water guns, steam injection sources, controllable seismic sources, explosive sources such as dynamite or gas injection followed by detonation and the like. The streamers 518 may be towed by means of their respective lead-ins 520, which may be made from high strength steel or fiber-reinforced cables that convey electrical power, control, and data signals between the vessel 511 and the streamers 518. An individual streamer may include a plurality of seismic receivers 521 that may be distributed at spaced intervals along the streamer's length. The seismic receivers 521 may include hydrophone sensors as well as multi-component sensor devices, such as accelerometers. Further, the streamers 518 may include a plurality of inline streamer steering devices (SSDs), also known as "birds." The SSDs may be distributed at appropriate intervals along the streamers 518 for controlling the streamers' depth and lateral movement. A single survey vessel may tow a single receiver array along individual sail lines, or a plurality of survey vessels may tow a plurality of receiver arrays along a corresponding plurality of the sail lines.

Figure 6:
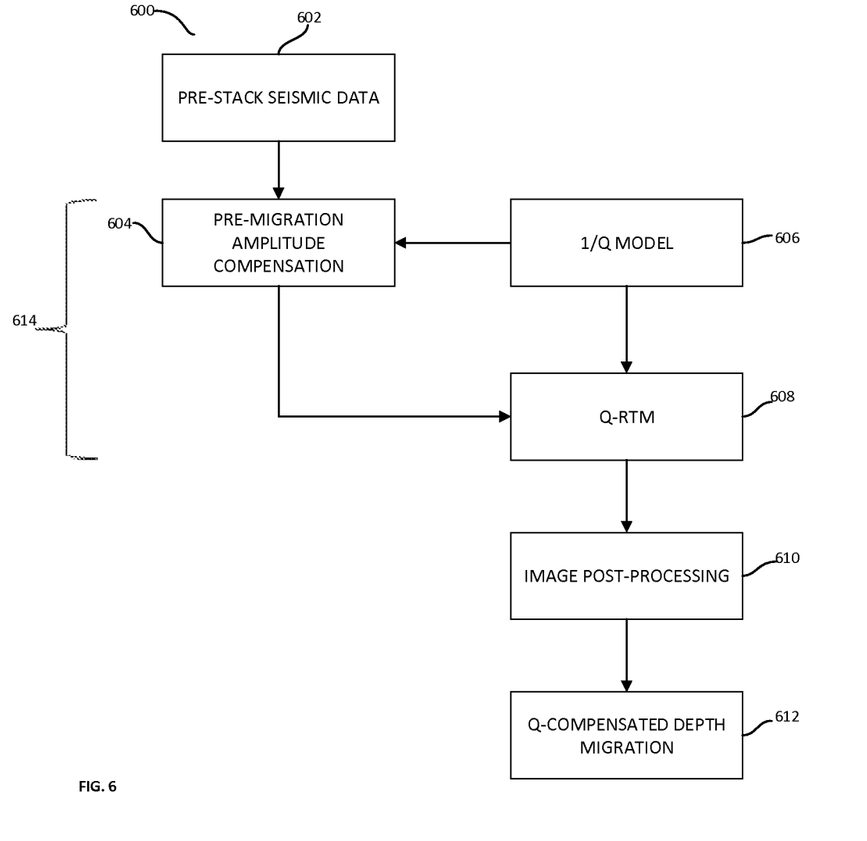
FIGS. 6 and 7 illustrate a flow diagram of a method for processing seismic data in accordance with various implementations described herein.
Figure 7:
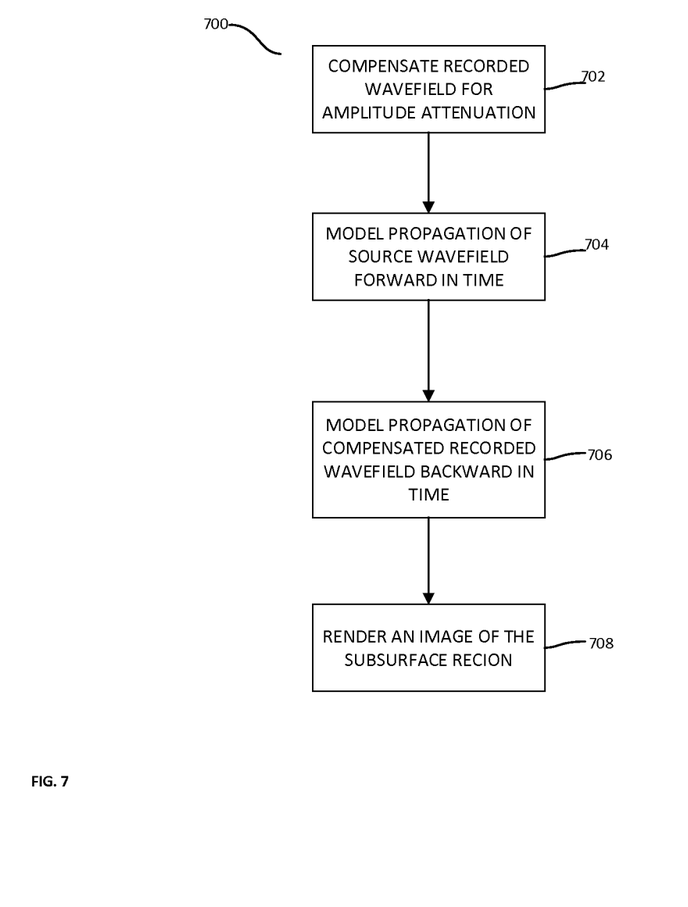

During acquisition, the seismic sources 516 and the seismic streamers 518 may be deployed from the vessel 511 and towed slowly to traverse a region of interest. The seismic sources 516 may be periodically activated to emit seismic energy in the form of an acoustic or pressure wave through the water. The sources 516 may be activated individually or substantially simultaneously with other sources. The acoustic wave may result in one or more seismic wavefields that travel coherently into the earth E underlying the water W. As the wavefields strike interfaces 504 between earth formations, or strata, they may be reflected and/or refracted back through the earth E and water W along paths 505 to the various receivers 521 where the wavefields (e.g., pressure waves in the case of air gun sources) may be converted to electrical signals, digitized and transmitted to the integrated computer-based seismic navigation, source controller, and recording system in the vessel 511 via the streamers 518 and lead-ins 520. For instance, a refracting or diving wave path 531 is shown passing through the earth E and water W from the sources 516 to the seismic receivers 521. Through analysis of these detected signals, it may be possible to determine the shape, position and lithology of the sub-sea formations, including those formations that may include hydrocarbon deposits. While a marine seismic survey is described in regard to FIG. 5, implementations of various techniques described herein may also be used in connection to a land seismic survey. One method for generating images of the subsurface of the earth from seismic data acquired by a seismic survey as described in FIGS. 6 and 7 is Reverse Time Migration (RTM). RTM may be described as a process in which the seismic wavefield generated by a source in the subsurface is simulated by forward modeling in time the propagation of the wavefield, and the wavefield generated at reflectors in the subsurface is simulated by backward propagating in time the wavefield recorded at the receivers. An image is formed using an imaging conditions, for example a cross correlation, at each point in the subsurface at which the forward propagated wavefield and the reverse propagated wavefield exist at the same point in time.

In one embodiment of a method of generating images of the subsurface disclosed herein, amplitude and phase distortions of seismic data a remediated in separate stages. In visco-acoustic wave propagation, phase compensation of both the source a receiver wavefields occurs automatically during migration as a result of the time reversal of a receiver-side wavefield. However, such modelling effectively attenuates seismic data amplitudes twice. In a first instance, seismic data amplitude may be attenuated during the actual propagation of the seismic energy through the subsurface. Secondly, seismic data amplitude may be attenuated during the backward-in-time simulated propagation within the migration. Those of ordinary skill in the art will recognize that these instances of attenuation degrade the quality of the data that is used to create models of the earth subsurface and may compromise exploration and production decisions.

FIG. 6 illustrates one embodiment of a method 600 for creating a model that compensates for seismic data amplitude and phase attenuation to enable a user render a more accurate model of a subsurface region/area. Seismic data from a seismic survey is received at a block 602. It is contemplated that the seismic data may be obtained by retrieval from electronic persistent memory, as will be described later. Such retrieval may be over a local network, from an attached electronic persistent storage device, or over a wide area network such as the internet.

In some embodiments, obtaining the data is a separate, independent, process from the process of generating the data by empirical measurement. Therefore, in some embodiments, seismic data may be measured by one entity through the usage of seismic survey equipment as described above. An entirely distinct entity may then access the seismic data electronically, either directly or over a network.

At block 604, the method 600 undertakes pre-migration amplitude compensation of the seismic data received at the block 602. The pre-migration amplitude compensation takes into account an input from a model of a seismic attenuation parameter Q that is provided by a block 606. The pre-migration amplitude compensation is described in greater detail with respect to FIGS. 6 and 7 below. Next at block 608 performs reverse time migration on the seismic data. Details of the reverse-time migration process are discussed hereinafter with respect to FIG. 7. Following the blow 608, a block 610 performs any image post-processing that may be specified by a user or operator of the method 600.

At block 612, the method 600 outputs a Q-compensated depth migration. The output may include the data itself, it may include a wavefield representation corresponding to the seismic data, it may include a graphical representation of the wavefield corresponding to the seismic data, or it may include a combination of any of the preceding. The output may be to electronic persistent storage, to a program module (e.g., for further processing), or to a human-readable display. Other types of output are also possible.

With continuing reference to FIGS. 6 and 7, a more detailed explanation of detailed explanation of a portion method 600 indicated by reference number 614 is discussed below in accordance to one embodiment of method 600. Following the pre-migration compensation at the block 602, the received wavefield or seismic data at block 604 is compensated for amplitude attenuation using the pre-migration model-based Q compensation workflow in a block 702. The PMMQ first computes a set of effective Q values by ray tracing using the user supplied velocity and Q models. The effective Q is the integrated Q over travel time solved by raytracing method along each geometric ray.

$$\frac{t}{Q_{\mathit{eff}}(t)} = \sum_{i,j,k}^{Ray} (t_{ijk} \cdot Q_{ijk}^{-1})$$

where,
$t = \sum_{i,j,k}^{Ray} t_{ijk}$ is the kinematic travel time computed by ray tracing, $t_{ijk}$ is the fragment of travel time in the cell (i, j, k), $Q_{ijk}$ is the Q value in each cell (i, j, k) provided by the Q model.

Once the effective Q values are computed, they are then regularized and interpolated to the grid to match the associated seismic pre-stacking data geometry. Lastly, a series of inverse Q filter is applied on the short, overlapping windows of data to compensate amplitude lost. The filters are computed based on the center time of each window T and is expressed as $$S_f = e^{\frac{\pi F T}{Q_{\mathit{eff}}}},$$

where $Q_{\mathit{eff}}$ is the effective Q, and f is the frequency.

Next, a standard linear solid (SLS) model is used to generate a Q response that is independent of frequency. To generate this Q response over a broad frequency range, three SLS models are incorporated into the wave equation:

$$\frac{1}{v^2} \frac{\partial^2 P}{\partial t^2} = (1 + L\tau)\rho \nabla \cdot \left(\frac{1}{\rho} \nabla P\right) + \sum_{l=1}^{L} r_l + f \quad (1)$$

$$\frac{\partial r_l}{\partial t} = -\frac{\tau}{\tau_{\sigma l}} \rho \nabla \cdot \left(\frac{1}{\rho} \nabla P\right) - \frac{1}{\tau_{\sigma l}} r_l,$$

where v is velocity, P is pressure, L=3 represents three memory variables, ρ is density, $r_l$ is the lth memory variable, ƒ is force, and $$\tau = \frac{\tau_{\epsilon l}}{\tau_{\sigma l}} - 1,$$

where $\tau_{\epsilon l}$ and $\tau_{\sigma l}$ are strain and stress relaxation time. The method of computing $\tau_{\epsilon l}$ and $\tau_{\sigma l}$ is described by Blanch et al. (1995). Memory variables are updated recursively. It is contemplated that Equation (1) may be extended to anisotropic media as well.

A block 704 models a propagation of a source wavefield or seismic data forward in time using finite difference, from an initial time-state to a final time-state through the earth model that is representative of the subsurface region of interest. The block 704 also compensates the phase and amplitude of the source wavefield or seismic data to account for effects of attenuation. Following the block 704, a block 706 models a propagation of the compensated recorded wavefield or seismic data (block 702) backward in time using finite difference, from a final time-state to an earlier time-state through the earth model. As discussed above, the subsurface region has an absorption characteristic that dampens the recorded wavefield or seismic data. To compensate for this absorption, the modelling at block 706 includes compensation for phase and amplitude effects of attenuation.

In certain embodiments, an additional step of amplitude compensation is applied the modelled compensated recorded wavefield following the block 706 before a block 708 renders an image of the subsurface of the region of interest. This optional amplitude compensation step may be a shot-by-shot amplitude compensation (i.e., for each fragment of time) or may be a hybrid normalization, wherein a weighted compensation factor is applied across the seismic data. In other embodiments, a block 708 renders an image of the subsurface of the region of interest following the block 706. In some other embodiments, other amplitude compensation step may also be a residual amplitude anomaly compensation (RAAC) after the block 708 to enable a user further amplify areas of the subsurface region.

In some embodiments, one or more aspects (e.g. operations) of the methods 600 and/or 700 may be executed by a computing system.

Figure 8:
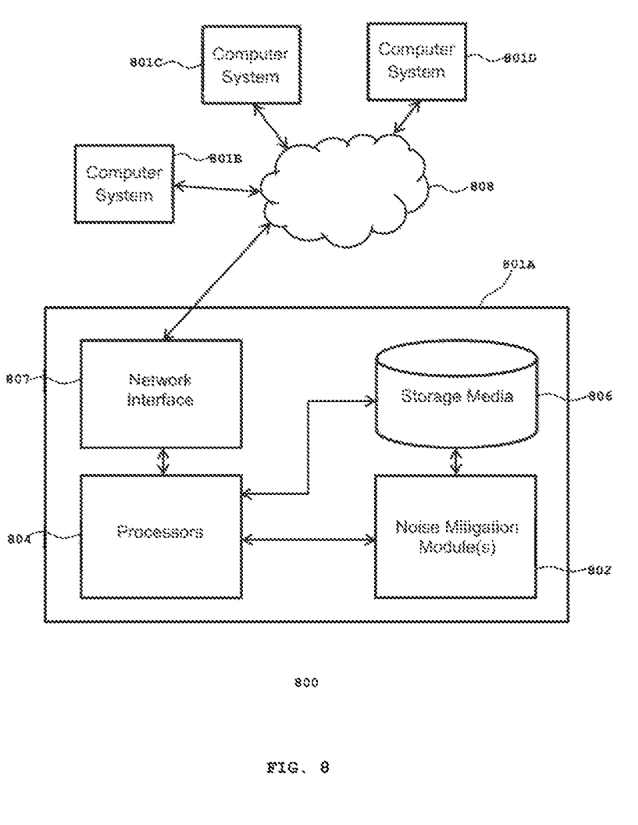
FIG. 8 illustrates a computing system in accordance with some embodiments

FIG. 8 illustrates an example computing system arrangement 800 in accordance with some embodiments. Computing system arrangement 800 may be an individual computer system or an arrangement of distributed computer systems. Computer system 801A includes one or more reverse-time migration modules 802 that are configured to perform various tasks according to some embodiments, such as one or more methods disclosed herein (e.g., methods 600 and 700 and/or combinations and/or variations thereof). To perform these various tasks, reverse-time migration module 802 executes independently, or in coordination with, one or more processors 804, which is (or are) connected to one or more storage media 806. The processor(s) 804 is (or are) also connected to a network interface 807 to allow the computer system 801A to communicate over a data network 808 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be in the field and/or on a laboratory, while in communication with one or more computer systems such as 801C and/or 801D that are located in one or more data centers, and/or located in varying countries on different continents and/or on various marine vehicles). Processors 804 may include a microprocessor, microcontroller, processor module or subsystem, programmable integrated circuit, programmable gate array, or another control or computing device.

The storage media 806 may be implemented as one or more computer-readable or machine-readable storage media. Note that while in the example embodiment of FIG. 8 storage media 806 is depicted as within computer system 801A, in some embodiments, storage media 806 may be distributed within and/or across multiple internal and/or external enclosures of computing system 801A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BluRays, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

It should be appreciated that computing system arrangement 800 is only one example of a computing system, and that computing system arrangement 800 may have more or fewer components than shown, may combine additional components not depicted in the example embodiment of FIG. 8, and/or computing system arrangement 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for processing seismic data comprising the steps of:
   receiving a wavefield generated by reflections in a subsurface region and recorded by a plurality of seismic receivers;
   compensating the recorded wavefield for amplitude attenuation;
   modelling a propagation of a source wavefield forward in time, from an initial time-state to a final time-state through an earth model that is representative of the subsurface region, and wherein modelling includes compensating for phase distortion and amplitude attenuation;
   modelling a propagation of the compensated recorded wavefield backward in time from a final time-state to an earlier time-state through the earth model, wherein the subsurface region has an absorption characteristic that dampens the recorded wavefield, and wherein modelling includes compensating at least for phase distortion; and
   rendering an image of a geological structure of the subsurface region based at least in part on the modelled source and the modelled compensated recorded wavefield.

2. The method of claim 1, further including a step of applying a post migration amplitude compensation to the modelled compensated recorded wavefields.

3. The method of claim 2, wherein the post migration amplitude compensation is applied for each fragment of time.

4. The method of claim 2, wherein the post migration compensation includes applying a weighted compensation factor across the seismic data.

5. The method of claim 2, wherein the post migration amplitude compensation includes a residual amplitude anomaly compensation.

6. A non-transitory computer-readable medium storing instructions that, when executed by one or more processors of a computing system, cause the computing system to perform operations, the operations comprising:
   receiving a wavefield generated by reflections in a subsurface region and recorded by a plurality of seismic receivers;
   compensating the recorded wavefield for amplitude attenuation;
   modelling a propagation of a source wavefield forward in time, from an initial time-state to a final time-state through an earth model that is representative of the subsurface region, and wherein modelling includes compensating for phase distortion and amplitude attenuation;
   modelling a propagation of the compensated recorded wavefield backward in time from a final time-state to an earlier time-state through the earth model, wherein the subsurface region has an absorption characteristic that dampens the recorded wavefield, and wherein modelling includes compensating at least for phase distortion; and
   rendering an image of a geological structure of the subsurface region based at least in part on the modelled source and the modelled compensated recorded wavefields.

7. The non-transitory computer-readable medium of claim 6, further including a step of applying a post migration amplitude compensation to the modelled compensated recorded wavefield.

8. The non-transitory computer-readable medium of claim 7, wherein the post migration amplitude compensation is applied for each fragment of time.

9. The non-transitory computer-readable medium of claim 7, wherein the post migration compensation includes applying a weighted compensation factor across the seismic data.

10. The non-transitory computer-readable medium of claim 7, wherein the post migration amplitude compensation includes a residual amplitude anomaly compensation.

11. A computing system, comprising:
    one or more processors; and
    a memory system comprising one or more non-transitory computer-readable media storing instructions that, when executed by at least one of the one or more processors, cause the computing system to perform operations, the operations comprising:

receiving a wavefield generated by reflections in a subsurface region and recorded by a plurality of seismic receivers;

compensating the recorded wavefield for amplitude attenuation;

modelling a propagation of a source wavefield forward in time, from an initial time-state to a final time-state through an earth model that is representative of the subsurface region, and wherein modelling includes compensating for phase distortion and amplitude attenuation;

modelling a propagation of the compensated recorded wavefield backward in time from a final time-state to an earlier time-state through the earth model, wherein the subsurface region has an absorption characteristic that dampens the recorded wavefield, and wherein modelling includes compensating at least for phase distortion; and rendering an image of a geological structure of the subsurface region based at least in part on the modelled source and the modelled compensated recorded wavefields.

12. The computing system of claim 11, further including a step of applying a post migration amplitude compensation to the modelled compensated recorded wavefield.

13. The computing system of claim 12, wherein the post migration amplitude compensation is applied for each fragment of time.

14. The computing system of claim 12, wherein the post migration compensation includes applying a weighted compensation factor across the seismic data.

15. The computing system of claim 11, further including a post migration amplitude compensation by applying a residual amplitude anomaly compensation after the image is rendered.

16. A method for processing seismic data comprising the steps of:

receiving a wavefield generated by reflections in a subsurface region and recorded by a plurality of seismic receivers;

compensating the recorded wavefield for amplitude attenuation;

modelling a propagation of a source wavefield forward in time, from an initial time-state to a final time-state through an earth model that is representative of the subsurface region, wherein the modelling includes compensating for phase distortion and amplitude attenuation;

modelling a propagation of the compensated recorded wavefield backward in time from a final time-state to an earlier time-state through the earth model, wherein the subsurface region has an absorption characteristic that dampens the recorded wavefield wherein the modelling includes compensating for phase distortion and amplitude attenuation;

applying a post migration amplitude compensation to the recorded wavefield; and rendering an image of a geological structure of the subsurface region based at least in part on the modelled source and the modelled compensated recorded wavefields.

17. The method of claim 16, wherein the post migration amplitude compensation is applied for each fragment of time.

18. The method of claim 16, wherein the post migration compensation includes applying a weighted compensation factor across the seismic data.

19. The method of claim 16, further including a post migration amplitude compensation by applying a residual amplitude anomaly compensation after the image is rendered.

20. The method of claim 1, wherein compensating the recorded wavefield for amplitude attenuation comprises generating a Q-response that is independent of frequency.

* * * * *